United States Patent Office 3,304,639
Patented Feb. 21, 1967

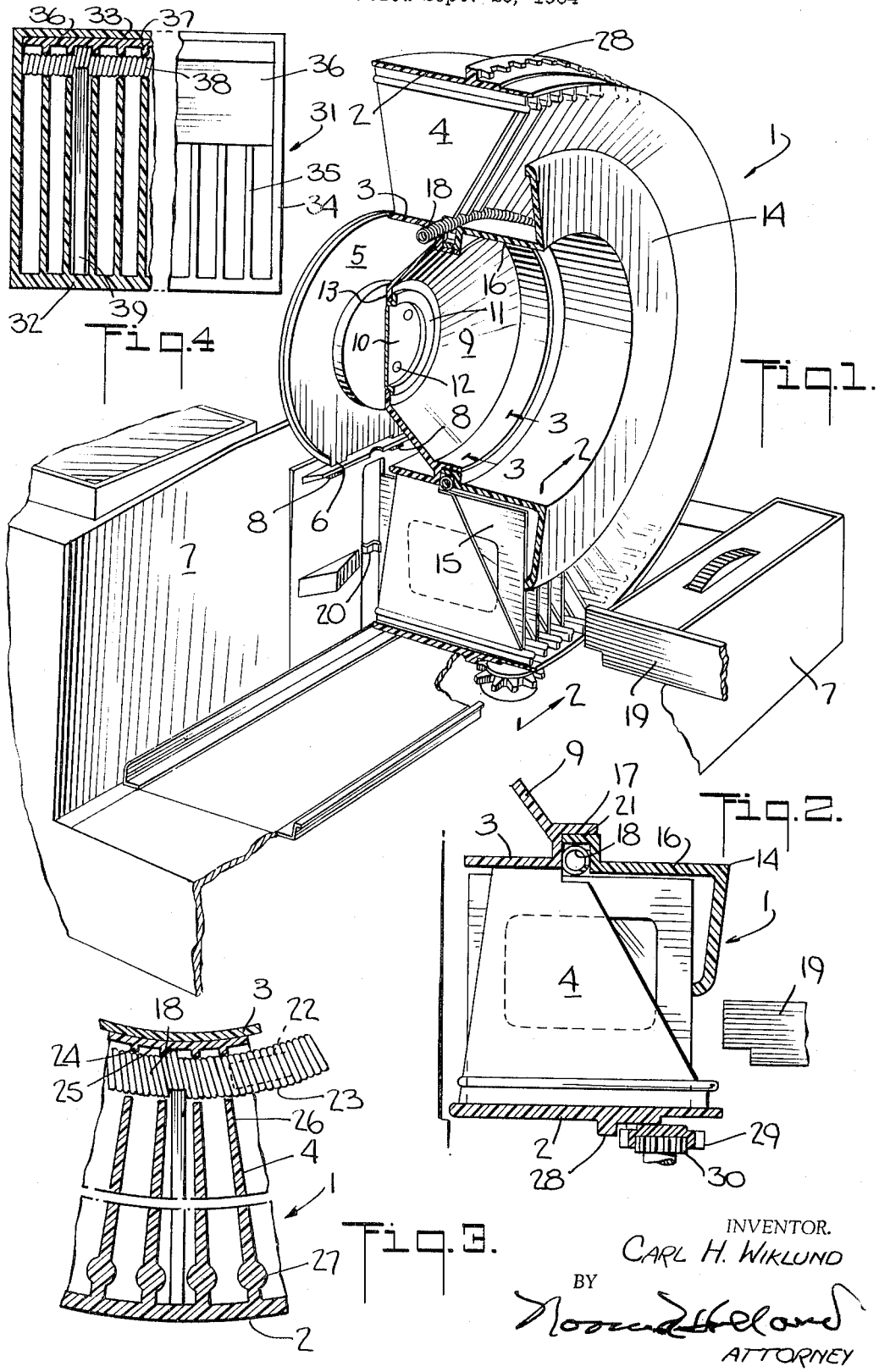

3,304,639
SLIDE MAGAZINE
Carl H. Wiklund, Brookfield, Conn., assignor to Airequipt Inc., New Rochelle, N.Y., a corporation of New York
Filed Sept. 29, 1964, Ser. No. 400,137
8 Claims. (Cl. 40—79)

The present invention relates to an improved slide magazine and more particularly to an improved slide magazine design particularly useful for circular magazines.

Magazines for storing and exhibiting a number of individual slides are well-known and certain of these magazines have been made in a rotary or circular form. These slide magazines are mounted for rotation about a central axis on a slide projecting or viewing device. The magazine of the present invention provides an improved structure particularly useful for such a rotary magazine providing for improved slide positioning and slide retention and also providing an improved means for rotatably mounting the magazine on the projector.

Accordingly an object of the present invention is to provide an improved slide magazine.

Another object of the present invention is to provide an improved slide retention means for a slide storage magazine.

Another object of the present invention is to provide an improved circular slide storage magazine.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 1 is a perspective view partially in section illustrating a preferred embodiment of the magazine shown in position on a typical slide projector;

FIG. 2 is a sectional view of the magazine taken along line 2—2 of FIG. 1;

FIG. 3 is a sectional view of the magazine taken along line 3—3 of FIG. 1; and

FIG. 4 is a front elevational view partially in section of another embodiment of the magazine.

The magazine accommodates a relatively large number of individual slides such as the well-known paper mounted colored slides or transparencies. A magazine having a diameter of about eight inches will accommodate 100 of the conventional 2 x 2 inch transparencies. The slides are removably positioned in radial compartments provided between an outer cylindrical wall 2 and an inner cylindrical wall 3. The individual slide compartments or pockets are defined by radially directed dividers 4 extending between the outer and inner walls 2 and 3. In the preferred embodiment, the inner and outer walls and the dividers 4 are molded as an integral unit.

The preferred mounting for rotatably supporting the magazine 1 on a projector comprises a support plate 5 which is detachably mounted in spaced apertures 6 on the slide projector 7 by the spaced support tabs 8. This support plate 5 is rotatably connected to a central support 9 on the magazine 1 by a bearing 10 having a flange 11 and conveniently attached to the plate 5 by rivets 12 or other connecting means so that the flange 11 slidably engages the inner circular edge 13 of the magazine center support 9.

The conically shaped center portion 9 of the magazine 1 is also preferably and most conveniently formed integrally with the inner and outer circular walls 2 and 3 of the magazine 1 and is molded together with these portions and the compartment dividers 4 as a single unit.

A circular hub 14 on the magazine 1 holds the slides 15 in the compartments at the correct storage position as illustrated by the slide 15 shown at the bottom of the magazine 1 in FIG. 1. The hub 14 is mounted on the magazine 1 by means of an inwardly projecting flange 16 which engages a complementary flange 17 on the center portion 9. The flange 16 is attached to the flange 17 by a friction fit and preferably by an additional attachment such as by a light coating of adhesive.

In order to resiliently retain each of the slides 15 in the magazine 1 during storage, handling, and projection, a resilient slide retaining member is preferably provided in the magazine 1. A preferred embodiment of this retaining member is a coil spring 18 mounted at the inner edge of the slide compartments in position to engage and releasably grip an edge of each slide 15. The spring 18 engages each slide with sufficient force to retain it in the magazine 1 against its own weight and the normal forces encountered in magazine handling but loosely enough so that it does not interfere with slide movement to and from the magazine during projection such as by a slide transfer member 19 and a cooperating pusher bar 20.

The slide retaining coil spring 18 is conveniently mounted in the magazine 1 between the hub 14 and the inner wall 3 in an annular channel formed by the radial flange 17 and a flange or step 21 on the inner edge of the hub flange 16 as best illustrated in FIG. 2. When the hub 14 is connected to the flange 17, the annular channel formed between the hub 14 and the inner wall 3 together with dividers 4 accommodates and lightly grips and confines the coil spring 18 leaving its outer portion in a position where it enters a slight distance into the slide retaining compartments. A convenient method of coupling the ends of the coil spring 18 together which insures the absence of any gaps in the retentive properties of the spring is illustrated in FIG. 3. One end of the spring 18 has a reduced diameter portion 22 adapted to slide into and to frictionally engage the larger diameter portion at the opposite end 23 of the spring 18.

An extremely efficient gripping action is obtained by the spring giving an excellent combination of slide retention and slide releasing properties by the structure illustrated in FIG. 3. The inner surface of the hub flange 21 has a series of radial teeth 24 one of which corresponds to each of the radial compartment dividers 4. The slide retaining spring 18 rests on these radially directed teeth 24 when there are no slides 15 in the magazine 1. When a slide 15 is placed in a compartment the open slot 25 between two adjacent teeth 24 and opposite the slide compartment accommodates the inwardly pressed coils of the spring 18 as they are engaged by the slide, thus, permitting the formation of a slide gripping slot in the spring for lightly holding each slide in place in the magazine.

The above described coil spring 18 is particularly advantageous for a circular slide tray as it is conveniently formed as an annular element providing uniform slide retention characteristics throughout its entire circumference. The spring is preferably formed of a relatively light spring wire to provide at least two or three coils for each slide compartment so that a good retentive force is obtained and so that the coils do not separate when engaged by a slide. It has also been found preferable to provide a spring which in its relaxed state has a slightly greater circumference than that of the accommodating channel. When such a spring is put into the channel a jig is used which forces all of the coil springs together thereby reducing its circumference and causing it to lie in its channel with the coils pressed together.

The coils will remain closely spaced when pushed in radially by a slide as illustrated in FIG. 3.

While a coil spring has proven particularly effective having the above described advantages, other annular elements may be substituted such as solid or hollow rings of rubber or resilient material.

The elongated coil spring or a generally equivalent annular member are particularly advantageous in circular magazines as they are readily inserted and as the slide retention characteristics are equal for all slide compartments. Such a spring may also be used, however, in a straight magazine such as illustrated in FIG. 4. In this magazine 31, walls 32 and 33 are spaced by end walls 34 and suitable slide compartment dividers 35. A spring retaining channel is provided by gluing or otherwise fastening a face plate 36 having a cross-section similar to that of the hub 14 of FIG. 2 to a flange on wall 33. Teeth 37 are preferably provided on the face plate 36 to provide an accommodating space opposite each slide compartment to receive the spring 38 when a slide 39 is inserted in the magazine.

As illustrated in FIG. 3, the radially directed compartment dividers of the magazine 1 are preferably made as thin as possible to permit the maximum number of slides to be retained in the magazine and to provide a light and attractive magazine. For this reason, the inner portions 36 of the dividers 4 are preferably made thinner than the outer portions causing the compartments to have an outwardly flared shape. The molded and rounded guides 27 at the outer portion of the compartments compensate for this compartment shape and act to hold in the slides 15 in a generally radial position in the compartments.

As indicated above the magazine 1 is rotatably mounted on the projector 7 on a mounting plate 5. A circular rack 28 is formed on the outer wall 2 of the magazine in position for engagement with a magazine indexing pinion 29 which intermittently advances to move the slide compartments into position adjacent to the transfer arm 19 and the pusher bar 20.

A projector such as the one illustrated preferably accommodates both circular and straight magazines. Since the individual slide receiving compartments of the circular magazines are generally wider than those required for the straight magazines, the pinion and the cooperating rack for indexing the circular magazine necessarily advance the magazine a greater distance during each indexing operation. In the preferred embodiment illustrated, this difference is conveniently compensated for by providing for a removable pinion 29 for the circular magazine (FIG. 2) which is dropped over the smaller pinion 30 provided for indexing a straight magazine through the same projector.

It will be seen that an improved magazine structure has been described which is particularly adopted for circular magazines. The structure of the magazine is also particularly suited for providing magazines with a high storage capacity wherein as many as 100 slides may be accommodated in a circular magazine. In addition a novel slide retaining means is described which is also particularly suited for rotary magazines and for providing equal slide retention force throughout the entire circumference of the magazine and for all compartments. As described above, the slide retention means also may be effectively used for magazines other than circular ones.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. A slide magazine comprising the combination of spaced wall members, dividers positioned intermediate said wall members forming a plurality of slide storage compartments, a member cooperating with one of said walls forming a channel opening into said compartments, an elongated resilient slide retaining member of generally circular cross section in the plane of the dividers positioned in said channel and having a portion extending into said compartments for being displaced transversely of its axis by and for releasably engaging the edges of slides for retaining the slides in said magazine.

2. A circular slide magazine comprising the combination of a pair of concentric and radially spaced generally cylindrical wall members, radially directed dividers positioned intermediate said wall members providing a plurality of slide storage compartments, a member cooperating with one of said walls forming an annular channel opening into said compartments, an annular coil spring positioned at least partially in said channel and having a portion extending into said compartments being displaced transversely of its axis by and for releasably engaging the edges of slides therein for retaining the slides in said magazine.

3. A circular slide magazine for a projector comprising the combination of a pair of concentric and radially spaced generally cylindrical wall members, radially directed dividers positioned intermediate said wall members forming a plurality of slide storage compartments, a hub member having inner and outer flanges, a flange on the inner cylindrical wall, the inner flange of said hub member cooperating with the flange on said inner cylindrical wall to form an annular channel opening into said compartments, an annular coil spring positioned at least partially in said channel and having a portion extending into said compartments for releasably engaging the edges of slides for retaining them in said magazine.

4. A circular slide magazine for a projector comprising the combination of a pair of concentric and radially spaced generally cylindrical wall members, radially directed dividers positioned intermediate said wall members forming a plurality of slide storage compartments, a hub member having inner and outer flanges, a flange on the inner cylindrical wall, the inner flange of said hub member cooperating with the flange on said inner cylindrical wall to form an annular channel opening into said compartments, teeth members on the inner flange of said hub member extending into said channel and opposite said compartment dividers, an annular coil spring positioned at least partially in said channel and having a portion extending into said compartments for releasably engaging the edges of slides for retaining them in said magazine, and a mounting member rotatably coupled with respect to said wall members and having means for releasably engaging the projector.

5. The magazine as claimed in claim 1 in which said resilient slide retaining member comprises a coil spring.

6. A circular slide magazine comprising the combination of a pair of concentric and radially spaced generally cylindrical wall members, radially directed dividers positioned intermediate said wall members forming a plurality of slide storage compartments, an annular channel in one of said wall members opening into said compartments, and an annular coil spring positioned at least partially in said channel and having a portion extending into said compartments being displaced transversely of its axis by and for releasably engaging the edges of slides therein for retaining the slides in said magazine.

7. A circular slide magazine comprising the combination of a pair of concentric and radially spaced generally cylindrical wall members, radially directed dividers positioned intermediate said wall members forming a plurality of slide storage compartments, an annular channel in the innermost of said wall members opening into said compartments, said channel having a recessed portion radially inwardly of each of said compartments, and an annular coil spring positioned at least partially in said channel and having a portion extending into said compartments being displaced transversely of its axis and for releasably engaging the edges of slides therein for retaining the slides in said magazine.

8. A circular slide magazine for a projector comprising the combination of a pair of concentric and radially spaced generally cylindrical wall members, radially directed dividers positioned intermediate said wall members forming a plurality of slide storage compartments, an annular channel in the innermost of said wall members opening into said compartments, an annular coil spring positioned at least partially in said channel and having a portion extending into said compartments being displaced transversely of its axis and for releasably engaging the edges of slides for retaining them in said magazine, and a mounting member rotatably coupled with respect to said wall members and having means for releasably engaging the projector.

References Cited by the Examiner

UNITED STATES PATENTS

| | | |
|---|---|---|
| 2,619,233 | 11/1952 | Weiskopf. |
| 2,748,653 | 6/1956 | Pollan _____ 40—33 X |
| 3,045,816 | 7/1962 | King _____ 40—79 X |
| 3,159,934 | 12/1964 | Wiklund _____ 40—79 |
| 3,209,647 | 10/1965 | Hall. |

EUGENE R. CAPOZIO, *Primary Examiner.*

W. GRIEB, *Assistant Examiner.*